United States Patent
Yang et al.

(10) Patent No.: US 6,328,275 B1
(45) Date of Patent: Dec. 11, 2001

(54) BIDIRECTIONAL PILOT OPERATED CONTROL VALVE

(75) Inventors: Xiaolong Yang, Germantown; Dwight B. Stephenson; Michael J. Paik, both of Delafield, all of WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 09/658,843

(22) Filed: Sep. 8, 2000

Related U.S. Application Data

(60) Provisional application No. 60/180,253, filed on Feb. 4, 2000.

(51) Int. Cl.[7] .............................. F16K 17/26; F16K 31/12
(52) U.S. Cl. ..................... 251/30.03; 251/33; 137/487.5; 137/493
(58) Field of Search ............................. 251/30.01, 30.02, 251/30.03, 30.04, 33; 137/487.5, 485, 488, 490, 493

(56) References Cited

U.S. PATENT DOCUMENTS

| | | | |
|---|---|---|---|
| 4,413,648 | * 11/1983 | Walters et al. | ............... 137/487.5 X |
| 4,603,708 | * 8/1986 | Altmann | ........................... 137/488 X |
| 4,981,280 | * 1/1991 | Brandenberg | ................. 251/30.02 X |
| 5,036,877 | 8/1991 | Distler et al. | ........................ 137/489 |
| 5,069,420 | * 12/1991 | Stobbs et al. | ..................... 251/30.02 |
| 5,072,752 | 12/1991 | Kolchinsky | ........................... 137/493 |
| 5,143,115 | 9/1992 | Geyler, Jr. | ............................ 137/493 |
| 5,174,544 | 12/1992 | Emainie | ............................ 251/30.01 |
| 5,551,664 | * 9/1996 | Boke | ................................. 251/30.03 |
| 5,878,647 | 3/1999 | Wilke et al. | ........................... 91/445 |
| 5,887,847 | * 3/1999 | Holborow | ............................. 251/33 |
| 5,975,486 | * 11/1999 | Dettmann | ......................... 251/30.02 |
| 6,149,124 | * 11/2000 | Yang | ................................. 251/30.03 |

* cited by examiner

Primary Examiner—David A. Scherbel
Assistant Examiner—Eric Keasel
(74) Attorney, Agent, or Firm—George E. Haas; Quarles & Brady LLP

(57) ABSTRACT

A pilot operated valve is provided to control a bidirectional flow of fluid between two ports. A main poppet selectively controls flow of fluid between the ports in response to pressure in a control chamber on one side of the main poppet. A pilot passage in the main poppet extends between the second port and the control chamber A first pair of check valves allow fluid to flow only into the pilot passage from the two ports. A second pair of check valves allow fluid to flow only into the control chamber from the two ports.

20 Claims, 1 Drawing Sheet

BIDIRECTIONAL PILOT OPERATED CONTROL VALVE

This application claims benefit of U.S. Provisional Patent Application No. 60/180,253 filed Feb. 4, 2000.

BACKGROUND OF THE INVENTION

The present invention relates to pilot operated hydraulic valves which are pressure balanced, and particularly to such valves that are bidirectional.

Construction and agricultural equipment have moveable members which are operated by an actuator, such as a hydraulic cylinder and piston arrangement that is controlled by a hydraulic valve. There is a present trend with respect to construction and agricultural equipment away from manually operated hydraulic valves toward electrical controls and the use of solenoid valves. This type of control simplifies the hydraulic plumbing as the control valves do not have to be located in the operator cab. This change in technology also facilitates computerized control of various machine functions.

Application of pressurized hydraulic fluid from a pump to the actuator can be controlled by a set of proportional solenoid valves of a type described in U.S. Pat. No. 5,878, 647. When an operator desires to move a member on the equipment a control lever is operated to send signals to the solenoid valves for the cylinder associated with that member. One solenoid valve is opened to supply pressurized fluid to the cylinder chamber one side of the piston and another solenoid valve opens to allow fluid being forced from the opposite cylinder chamber to drain to a reservoir, or tank. By varying the degree to which the solenoid valves are opened, the rate of flow into the associated cylinder chamber can be varied, thereby moving the piston at proportionally different speeds.

Solenoid operated pilot valves are well known for controlling the flow of hydraulic fluid and employ an electromagnetic coil which moves an armature in one direction to open a valve. The armature acts on a pilot poppet that controls the flow of fluid through a pilot passage in a main valve poppet. The amount that the valve opens is directly related to the magnitude of electric current applied to the electromagnetic coil, thereby enabling proportional control of the hydraulic fluid flow. Either the armature or another valve member is spring loaded to close the valve when electric current is removed from the solenoid coil.

A drawback of conventional solenoid operated pilot valves results from effects produced by the pressure differential that develops across the valve in the closed state. That pressure differential changes with variation in the load applied to the equipment component that is operated by the hydraulic fluid from the valve. The load and the supply pressure variation affect the pressure at the valve's outlet and produces that pressure differential across the valve. In the closed state, the pressure differential can affect the amount of force required to open the valve and required to produce a given flow rate of the hydraulic fluid. Therefore in a solenoid operated valve, variation in this pressure differential affects the magnitude of electrical current required to operate the valve.

This problem was addressed by providing a pressure balancing stem in the pilot valve passage, as shown in U.S. Pat. No. 5,878,647. This balanced the pressures so that the only forces acting on the pilot poppet were those from the return spring and the electromagnetic coil. While this overcame the effects due to a pressure imbalance in other designs, fluid leakage often occurred along the balancing stem. Attempts to provide a better seal against that leakage increased friction acting on the stem and created a sticking problem that adversely affected smooth valve operation.

Conventional pilot-operated poppet valves are single directional. There is an inlet port and an outlet port of the valve and the pressure at the inlet port is communicated to the pilot control chamber thus enabling the valve to open when the inlet port pressure is greater than the pressure at the outlet port. This enables fluid to flow from the inlet port to the outlet port. Because of this arrangement, the valve can not be used to control the flow of fluid in the reverse direction from the outlet port to the inlet port. In some hydraulic systems, a bidirectional flow is desired to be controlled. To accommodate flow in both direction a second valve connected in a reverse parallel manner to the first valve was required. Therefore, it is desirable to create bidirectional pilot-operated poppet valve.

SUMMARY OF THE INVENTION

A bidirectional pilot operated control valve has a body with a first port, a second port, and a valve seat between the first port and second port. A main valve poppet selectively engages the valve seat within the body to control flow of fluid between the first port and second port. A control chamber is formed within the body on a side of the main valve poppet that is remote from the valve seat. The main valve poppet has a pilot passage extending between the second port and the control chamber.

A first check valve is located in the main valve poppet and allows fluid to flow only from the pilot passage into the second port. A second check valve, located in the main valve poppet, allows fluid to flow only fluid to flow only from the pilot passage into the first port.

A pilot poppet selectively seals the pilot passage when operated on by an actuator that moves the pilot poppet with respect to the main valve poppet.

A first passage extends between the control chamber and the second port. A third check valve allows fluid to flow through the first passage only in the direction from the second port to the control chamber. A second passage extends between the control chamber and the first port. A fourth check valve allows fluid to flow through the second passage only in the direction from the first port to the control chamber.

DETAILED DESCRIPTION OF THE INVENTION

Figure 1:
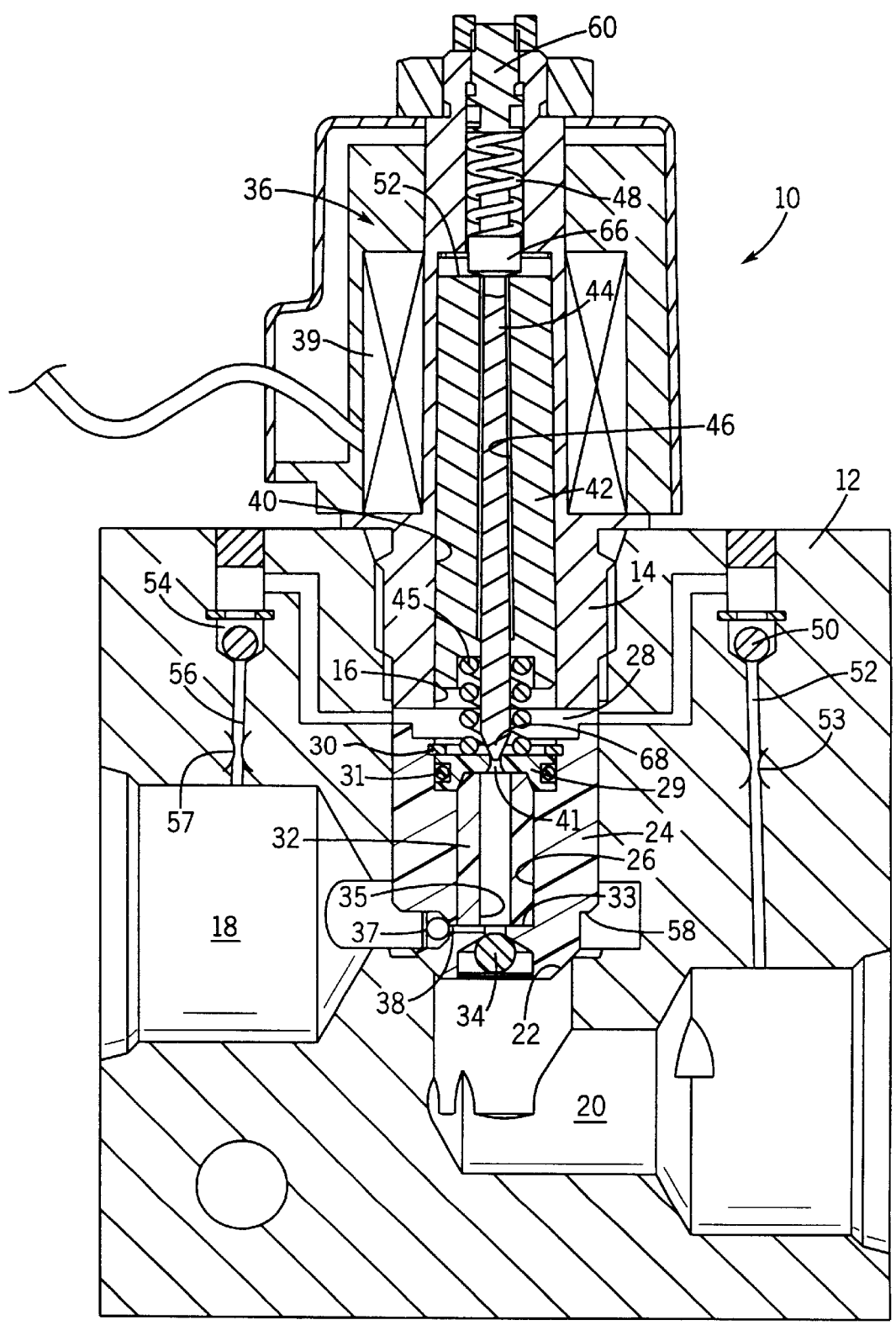
FIG. 1 is cross section through a bidirectional solenoid operated pilot valve according to the present invention.

With initial reference to FIG. 1, a solenoid valve 10 useful in controlling equipment actuators comprises a cylindrical valve cartridge 14 mounted in a longitudinal bore 16 of a valve body 12. The valve body 12 has a transverse first port 18 which communicates with the longitudinal bore 16. An second port 20 extends through the valve body 12 and communicates with an interior end of the longitudinal bore 16. A valve seat 22 is formed between the first and second ports 18 and 20.

A main valve poppet 24 slides within the longitudinal bore 16 with respect to the valve seat 22 to selectively control flow of hydraulic fluid between the first and second ports. The main valve poppet 24 preferably is made from a thermoplastic that is reinforced with glass fibers, such as Torlon (trademark of BP Amoco Plc). A central bore 26 is formed in the main valve poppet 24 and extends from an opening at the second port 20 to a second opening into a control chamber 28 on the remote side of the main valve poppet. The central bore 26 has a shoulder 33 spaced from the first end that opens into the second port 20. A first check valve 34 is located in the main valve poppet between the shoulder 33 and the first opening to allow fluid to flow only from the poppet's central bore 26 into the second port 20.

A second check valve 37 is located within the main valve poppet 24 in a passage 38 that extends between the first port 18 and the central bore 26 adjacent to the shoulder 33. The second check valve 37 limits fluid flow in the passage 38 to only a direction from the poppet bore 26 to the first port. Both flow passages controlled by the first and second check valves 34 and 37 are in constant communication with the bore 26 in the main valve poppet 24.

The second opening of the bore 26 in the main valve poppet 24 is closed by a flexible seat 29 with a pilot aperture 41 extending there through. The flexible seat 29 is held in place by a snap ring 30 and an O-ring 31 provides a seal between the seat and the wall of the central bore 26. A resilient tubular column 32 made of the same material as the main valve poppet 24 is within the central bore 26 and biases the flexible seat 29 with respect to the shoulder 33. Opposite sides of the flexible seat 29 are exposed to the pressures in the control chamber 28 and in a pilot passage 35 formed in the main valve poppet 24 by the tubular column 32.

The valve body 12 incorporates a third check valve 50 in a passage 52 extending between the control chamber 28 and the second port 20. The third check valve 50 allows fluid to flow only in the direction from the second port 20 to the control chamber 28. A fourth check valve 54 is located in another passage 56 and limits fluid flow in that passage only from the first port 18 to the control chamber 28. Both of these check valve passages 52 and 56 have a have a flow restricting orifice 53 and 57 respectively.

Movement of the main valve poppet 24 is controlled by a solenoid 36 comprising an electromagnetic coil 39, an armature 42 and a pilot poppet 44. The armature 42 is positioned within a bore 40 through the cartridge 14 and a first spring 45 biases the main valve poppet 24 away from the armature. The electromagnetic coil 39 is located around and secured to cartridge 14. The armature 42 slides within the cartridge bore 40 away from main valve poppet 24 in response to an electromagnetic field created by applying electric current to the electromagnetic coil 39. The pilot poppet 44 is located within a bore 46 of the tubular armature 42 and is biased into the armature by a second spring 48 that engages an adjusting screw 60 threaded into the cartridge bore 40.

In the de-energized state of the electromagnetic coil 39, the second spring 48 forces the pilot poppet 44 against end 52 of the armature 42, pushing both the armature and the pilot poppet toward the main valve poppet 24. This results in a conical tip of the pilot poppet 44 entering and closing the pilot aperture 41 in the resilient seat 29 and the pilot passage 35, thereby closing fluid communication between the control chamber 28 and the second port 20.

The solenoid valve 10 proportionally controls the flow of hydraulic fluid between the first and second ports 18 and 20. The electric current generates an electromagnetic field which draws the armature 42 into the solenoid 36 and away from the main valve poppet 24. The magnitude of that electric current determines the amount that the valve opens and the rate of hydraulic fluid flow through the valve is proportional to that current. Specifically, when the pressure at the first port 18 exceeds the pressure at the pressure at second port 20, the higher pressure is communicated to the control chamber 28 through the fourth check valve 54. As the armature 42 moves, head 66 on the pilot poppet 44 is forced away from the main valve poppet 24 opening the pilot aperture 41. That action results in hydraulic fluid flowing from the first port 18 through the control chamber 28, pilot passage 35 and the first check valve 34 to the second port 20.

The flow of hydraulic fluid through the pilot passage 35 reduces the pressure in the control chamber 28 to that of the second port 20. Thus the higher pressure in the first port 18 that is applied to the surface 58 forces main valve poppet 24 away from valve seat 22 thereby opening direct communication between the first port 18 and the second port 20. Movement of the main valve poppet 24 continues until a pressure of force balance is established across the main poppet 24 due to constant flow through the orifice 57 and the effective orifice of the pilot opening to the pilot aperture 41. Thus, the size of this valve opening and the flow rate of hydraulic fluid there through are determined by the position of the armature 42 and pilot poppet 44. Those positions are in turn controlled by the magnitude of current flowing through electromagnetic coil 39.

The effect that a pressure differential has on the pilot poppet 44 is counter balanced by the flexible pilot seat 29 deflecting in response to that pressure differential. Such movement effectively changes the axial position of the pilot seat 29 so as to offset the pressure force change on the pilot valve. The designed flexibility of the seat is determined based on the pilot spring rate.

The proportional control valve 10 can open only in response to activation of the solenoid 36 and not in response to high pressure in either the first or second ports 18 and 20. When pressure in the second port 20 exceeds the pressure in the control chamber 28, the first check valve 50 opens communicating that higher pressure to the control chamber equalizing the pressure on opposite sides of the main valve poppet 24. With those pressures being equal, the poppet surface area differential between the control chamber 28 and the second port 20, as well as the spring force on the pilot poppet 44, keep the main valve poppet 24 closed.

When the pressure in the second port 20 exceeds the pressure in the inlet port 18, proportional flow from the outlet port to the inlet port can be obtained activating the solenoid 36. In this case the higher second port pressure is communicated through the third check valve 54 to the control chamber 28 and when the pilot poppet 44 moves away from the pilot seat 29 fluid flows from the control chamber, pilot passage 35 and second check valve 37 to the first port 18. This results in the main valve poppet 24 opening due to the higher pressure acting on its bottom surface.

What is claimed is:

1. A bidirectional pilot operated control valve comprising:
   a body having a first port and a second port through which fluid enters and leaves the bidirectional pilot operated control valve, and the body including a valve seat between the first port and the second port;
   a main poppet selectively engaging the valve seat to control flow of fluid between the first port and the second port, and forming a control chamber on a side of the main poppet remote from the valve seat, a pilot passage in the main poppet communicating with the first port, second port and the control chamber;
   a first flow control element which allows fluid to flow only from the pilot passage into the second port;
   a second flow control element which allows fluid to flow only fluid to flow only from the pilot passage into the first port;
   a pilot poppet which selectively closes the pilot passage;
   an actuator operably coupled to move the pilot poppet with respect to the main poppet;
   a first passage extending between the control chamber and the second port;
   third flow control element which allows fluid to flow through the first passage only in the direction from the second port to the control chamber;

a second passage extending between the control chamber and the first port;

a fourth flow control element which allows fluid to flow through the second passage only in the direction from the first port to the control chamber.

2. The bidirectional pilot operated control valve as recited in claim 1 wherein the pilot passage has an opening into the control chamber; and the pilot poppet selectively opens the pilot passage.

3. The bidirectional pilot operated control valve as recited in claim 1 wherein the first flow control element and the second flow control element are in the main poppet.

4. The bidirectional pilot operated control valve as recited in claim 1 wherein the pilot passage has an opening into the control chamber; and further comprises a flexible valve seat extending across the opening and having an aperture there through, wherein the pilot poppet engages the flexible valve seat to seal the pilot passage.

5. The bidirectional pilot operated control valve as recited in claim 4 wherein the flexible valve seat has a first side exposed to pressure in the control chamber and a second side exposed to pressure in the pilot passage, wherein a difference in pressure between the control chamber and the pilot passage flexes the flexible valve seat.

6. The bidirectional pilot operated control valve as recited in claim 4 wherein the flexible valve seat and the main poppet are formed as a single piece.

7. The bidirectional pilot operated control valve as recited in claim 6 wherein the flexible valve seat and the main poppet are formed of a thermoplastic material.

8. The bidirectional pilot operated control valve as recited in claim 4 wherein the flexible valve seat is formed in a recess in the main poppet at one end of the pilot passage.

9. The bidirectional pilot operated control valve as recited in claim 1 wherein the actuator uses a solenoid with an armature that engages the pilot poppet.

10. The bidirectional pilot operated control valve as recited in claim 1 wherein the first passage and the second passage are formed in the body.

11. A bidirectional pilot operated control valve comprising:

a body defining a first port, a second port, and a valve seat between the first port and the second port;

a main poppet selectively engaging the valve seat to control flow of fluid between the first port and the second port, and forming a control chamber in the body on a side of the main poppet remote from the valve seat, a pilot passage in the main poppet connecting the first port, the second port and the control chamber;

a first check valve located in the main poppet allows fluid to flow only from the pilot passage into the second port;

a second check valve located in the main poppet allows fluid to flow only fluid to flow only from the pilot passage into the first port;

a pilot poppet which selectively opens the pilot passage;

an actuator operably coupled to move the pilot poppet with respect to the main poppet;

a first passage extending between the control chamber and the second port;

third check valve allows fluid to flow through the first passage only in the direction from the second port to the control chamber;

a second passage extending between the control chamber and the first port;

a fourth check valve allows fluid to flow through the second passage only in the direction from the first port to the control chamber.

12. The bidirectional pilot operated control valve as recited in claim 11 wherein the pilot passage has an opening into the control chamber; and further comprises a flexible valve seat extending across the opening and having an aperture there through, wherein the pilot poppet engages the flexible valve seat to seal the pilot passage.

13. The bidirectional pilot operated control valve as recited in claim 12 wherein the flexible valve seat has a first side exposed to pressure in the control chamber and a second side exposed to pressure in the pilot passage, wherein a difference in pressure between the control chamber and the pilot passage flexes the flexible valve seat.

14. The bidirectional pilot operated control valve as recited in claim 11 wherein the pilot passage has an opening from the control chamber; and the pilot poppet selectively opens the pilot passage.

15. A pilot operated control valve comprising:

a body having a first port and a second port through which fluid enters and leaves the bidirectional pilot operated control valve, and the body including a valve seat between the first port and the second port;

a main poppet selectively engaging the valve seat to control flow of fluid between the first port and the second port, and forming a control chamber on a side of the main poppet remote from the valve seat, a pilot passage in the main poppet communicating with the first port, second port and the control chamber;

a first flow control element which allows fluid to flow from the pilot passage into only one of the first port and the second port;

a pilot poppet which selectively closes the pilot passage;

an actuator operably coupled to move the pilot poppet with respect to the main poppet;

a first passage extending between the control chamber and the second port;

second flow control element which allows fluid to flow through the first passage only in the direction from the second port to the control chamber;

a second passage extending between the control chamber and the first port;

a third flow control element which allows fluid to flow through the second passage only in the direction from the first port to the control chamber.

16. The pilot operated control valve as recited in claim 15 further comprising a fourth flow control element which allows fluid to flow from the pilot passage into only another one of the first port and the second port.

17. The pilot operated control valve as recited in claim 15 wherein the pilot passage has an opening into the control chamber; and the pilot poppet selectively opens the pilot passage.

18. The pilot operated control valve as recited in claim 15 wherein the first flow control element is in the main poppet.

19. The pilot operated control valve as recited in claim 15 wherein the pilot passage has an opening into the control chamber; and further comprises a flexible valve seat extending across the opening and having an aperture there through, wherein the pilot poppet engages the flexible valve seat to seal the pilot passage.

20. The pilot operated control valve as recited in claim 19 wherein the flexible valve seat has a first side exposed to pressure in the control chamber and a second side exposed to pressure in the pilot passage, wherein a difference in pressure between the control chamber and the pilot passage flexes the flexible valve seat.

* * * * *